United States Patent
Nivala et al.

(10) Patent No.: US 10,489,420 B2
(45) Date of Patent: *Nov. 26, 2019

(54) METHOD, AN APPARATUS AND A COMPUTER PROGRAM PRODUCT FOR PROVIDING MOBILE ACCESS TO A DATA REPOSITORY

(71) Applicant: M-Files Oy, Tampere (FI)

(72) Inventors: Antti Nivala, Pirkkala (FI); Gregory C. Milliken, Austin, TX (US); Mikko Rantanen, Tampere (FI); Jyri Mantysalo, Tampere (FI)

(73) Assignee: M-FILES OY (FI)

( * ) Notice: Subject to any disclaimer, the term of this patent is extended or adjusted under 35 U.S.C. 154(b) by 196 days.

This patent is subject to a terminal disclaimer.

(21) Appl. No.: 15/010,339

(22) Filed: Jan. 29, 2016

(65) Prior Publication Data

US 2017/0220657 A1 Aug. 3, 2017

(51) Int. Cl.
*G06F 7/00* (2006.01)
*G06F 17/30* (2006.01)
*G06F 16/27* (2019.01)

(52) U.S. Cl.
CPC .................. *G06F 16/27* (2019.01)

(58) Field of Classification Search
CPC ......... G06F 17/30575; G06F 17/30563; G06F 17/30592; G06F 16/27; G06F 16/93; G06F 16/211; G06F 16/282; G06F 16/9024
USPC ........... 707/624, 736, 737, 999.104, 999.107
See application file for complete search history.

(56) References Cited

U.S. PATENT DOCUMENTS

| | | | |
|---|---|---|---|
| 2007/0078897 A1 | 4/2007 | Hayashi et al. | |
| 2007/0226810 A1* | 9/2007 | Hotti | H04L 67/1095 726/30 |
| 2011/0004897 A1* | 1/2011 | Alexander | H04N 7/17336 725/32 |
| 2015/0324379 A1* | 11/2015 | Danovitz | G06F 17/30109 707/825 |
| 2017/0169528 A1* | 6/2017 | Kundu | G06Q 50/14 |

OTHER PUBLICATIONS

M-Files Enterprise Information Management: "Webinar: Got a Data/Content Disconnect?"; Sep. 24, 2015; p. 1.

(Continued)

*Primary Examiner* — Md I Uddin
(74) *Attorney, Agent, or Firm* — Ware, Fressola, Maguire & Barber LLP

(57) ABSTRACT

The invention relates to a method, an apparatus and a computer program product. The method comprises managing data in one or more data repositories by a centralized content management system comprising at least one server, wherein said one or more data repositories are connected to said centralized content management system, and at least one of said one or more data repositories resides on a device that is other than a server of the centralized content management system, wherein the method further comprises receiving by a server of the centralized content management system a request from a mobile client device to access data in a data repository connected to the centralized content management system; and providing the mobile client device with an access to the data repository by the centralized content management system.

18 Claims, 6 Drawing Sheets

(56) References Cited

OTHER PUBLICATIONS

M-Files Enterprise Information Management: "Webinar: How's SharePoint working for you?"; Nov. 17, 2015, p. 1.
Anonymous; "We've Launched M-Files Cloud Vault!"; M-Files Blog; Sep. 1, 2010; pp. 1-9.
Anonymous; "M-Files 2015.1 New Features and Enhancements"; Sep. 24, 2015; pp. 1-33.
David Carasso; "Exploring Splunk: Search Processing Language (SPL) Primer and Cookbook"; New York; Apr. 30, 2012; retrieved from the Internet: https://www.splunk.com/pdfs/exploring-splunk.pdf on May 7, 2018; pp. 1-154.
Examination Report dated Nov. 14, 2018 issued by the European Patent Office in corresponding EP Patent Application No. 17397501.2, 24 pages.

\* cited by examiner

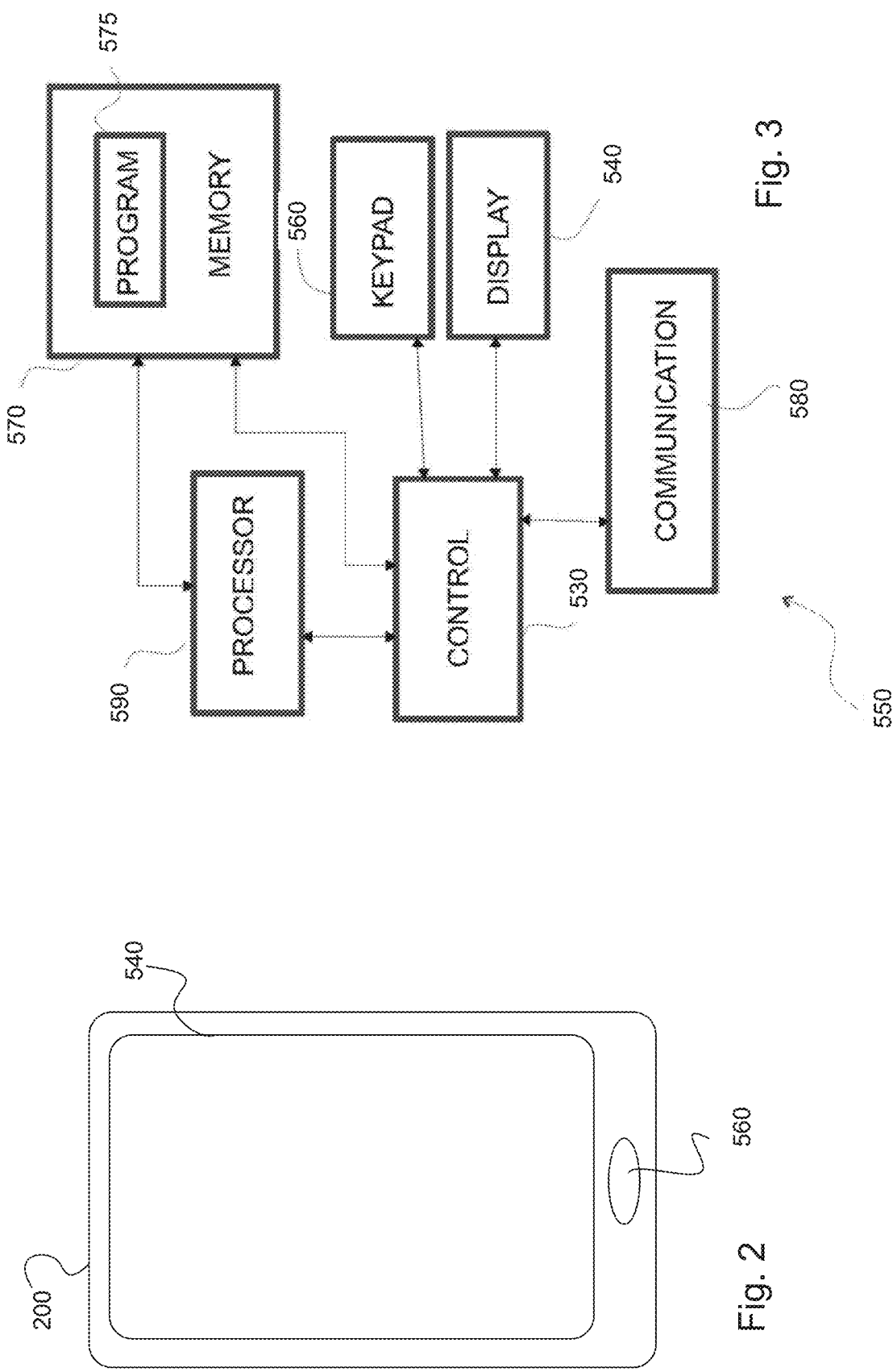

| Class: | Agreement |
| --- | --- |
| Name: | Co-operation |
| Organization: | Biz LTD |
| Other party: | Plumbers LTD |
| Starting date: | 1 June 2015 |
| Expiry date: | 1 June 2020 |
| Value: | 30,000 |
| Responsible person: | Mike More |
| Contact person: | Luke Less |
| Workflow state: | Signed |

METHOD, AN APPARATUS AND A COMPUTER PROGRAM PRODUCT FOR PROVIDING MOBILE ACCESS TO A DATA REPOSITORY

TECHNICAL FIELD

The present embodiments generally relate to the field of content management systems. In particular, the present embodiments relate to a content management system providing mobile access to connected data repositories.

BACKGROUND

An Enterprise Content Management (ECM) system, also known as an Enterprise Information Management (EIM) system, refers to a system for organizing and storing an organization's electronic documents and other business-related data and/or content. ECM systems may comprise content management systems (CMS), document management systems (DMS), and data management systems. Such systems comprise various features for managing electronic documents and data, e.g., storing, versioning, indexing, searching for, and retrieval of documents.

Due to the increase of electronic content and data, there is a need for dividing content and data between several data repositories. For example, some data may be located on a disk drive, while some other data is located on a cloud server. In addition, data can be divided between several content management systems according to the nature of the data.

SUMMARY

Now there has been invented an improved method and technical equipment implementing the method, by which a mobile client device is able to access several data repositories efficiently. Various aspects of the invention include a method, an apparatus, and a computer readable medium comprising a computer program stored therein, which are characterized by what is stated in the independent claims. Various embodiments of the invention are disclosed in the dependent claims.

According to a first aspect, there is provided a method comprising managing data in one or more data repositories by a centralized content management system comprising at least one server, wherein said one or more data repositories are connected to said centralized content management system, and at least one of said one or more data repositories resides on a device that is other than a server of the centralized content management system, receiving by a server of the centralized content management system a request from a mobile client device to access data in a data repository connected to the centralized content management system; and providing the mobile client device with an access to the data repository by the centralized content management system.

According to an embodiment, a data repository is located in one of the following: on-premises data center comprising a firewall, in cloud.

According to an embodiment, the server of the centralized content management system is located in one of the following: on-premises, in cloud.

According to an embodiment, the method further comprises receiving a request from the mobile client device to mark a data item in the data repository for offline availability; creating a local copy of the data item; storing the local copy of the data item to a memory of the mobile client device.

According to an embodiment, the method further comprises closing the access for the mobile client device to the data repository; receiving from a user modifications on the local copy of the data item by a client application of the centralized content management system; saving the modifications on the local copy of the data item; and when a new request from the mobile client device is received to access the data repository, synchronizing at least the local copy of the data item from the mobile client device to the data item in the data repository.

According to an embodiment, the method further comprises receiving a request to store a new data item to a data repository.

According to an embodiment, the method further comprises receiving a request to open a data item from a data repository.

According to an embodiment, the centralized content management system comprises a pluggable connector framework for connecting a new data repository to the centralized content management system by using a pluggable connector component.

According to an embodiment, the method further comprises displaying data items from more than one data repository in a same virtual folder when the data items have metadata matching metadata-based criteria of said virtual folder.

According to an embodiment, the method further comprises receiving a request from a user to display data items being related to a specific data item; determining data items that refer to the specific data item and the data items that the specific data item refers to; and displaying the determined data items, wherein at least one of the determined data items is stored in a different data repository than the specific data item.

According to a second aspect, there is provided an apparatus comprising at least one processor, memory including computer program code, the memory and the computer program code configured to, with the at least one processor, cause the apparatus to perform at least the following: manage data in one or more data repositories by a centralized content management system comprising at least one server, wherein said one or more data repositories are connected to said centralized content management system, and at least one of said one or more data repositories resides on a device that is other than the apparatus, receive a request from a mobile client device to access data in a data repository connected to the centralized content management system; and provide the mobile client device with an access to the data repository by the centralized content management system.

According to an embodiment, the apparatus is a server of the centralized content management system.

According to an embodiment, a data repository is located in one of the following: on-premises data center comprising a firewall, in cloud.

According to an embodiment, the apparatus is located in one of the following: on-premises, in cloud.

According to an embodiment, the apparatus further comprises computer program code to cause the apparatus to receive a request from the mobile client device to mark a data item in the data repository for offline availability; create a local copy of the data item; and store the local copy of the data item to a memory of the mobile client device.

According to an embodiment, the apparatus further comprises computer program code to cause the apparatus to close the access for the mobile client device to the data repository; and when a new request from the mobile client device is received to access the data repository, synchronize at least the local copy of the data item from the mobile client device to the data item in the data repository.

According to an embodiment, the apparatus further comprises computer program code to cause the apparatus to receive a request to store a new data item to a data repository.

According to an embodiment, the apparatus further comprises computer program code to cause the apparatus to receive a request to open a data item from a data repository.

According to an embodiment, the centralized content management system comprises a pluggable connector framework for connecting a new data repository to the centralized content management system by using a pluggable connector component.

According to an embodiment, the apparatus further comprises computer program code to cause the apparatus to display data items from more than one data repository in a same virtual folder when the data items have metadata matching metadata-based criteria of said virtual folder.

According to an embodiment, the apparatus further comprises computer program code to cause the apparatus to receive a request from a user to display data items being related to a specific data item; determine data items that refer to the specific data item and the data items that the specific data item refers to; and display the determined data items, wherein at least one of the determined data items is stored in a different data repository than the specific data item.

According to a third aspect, there is provided a computer program product embodied on a non-transitory computer readable medium, comprising computer program code configured to, when executed on at least one processor, cause an apparatus or a system to: manage data in one or more data repositories by a centralized content management system comprising at least one server, wherein said one or more data repositories are connected to said centralized content management system, and at least one of said one or more data repositories resides on a device that is other than a server of the centralized content management system; receive by a server of the centralized content management system a request from a mobile client device to access data in a data repository connected to the centralized content management system; and provide the mobile client device with an access to the data repository by the centralized content management system.

DESCRIPTION OF THE DRAWINGS

In the following, various embodiments of the invention will be described in more detail with reference to the appended drawings, in which

FIG. 2 shows an example of a layout of a mobile client device;

FIG. 3 shows a block chart of an apparatus according to an embodiment;

FIG. 5 shows a metadata card according to an embodiment;

DESCRIPTION OF EXAMPLE EMBODIMENTS

Figure 1:
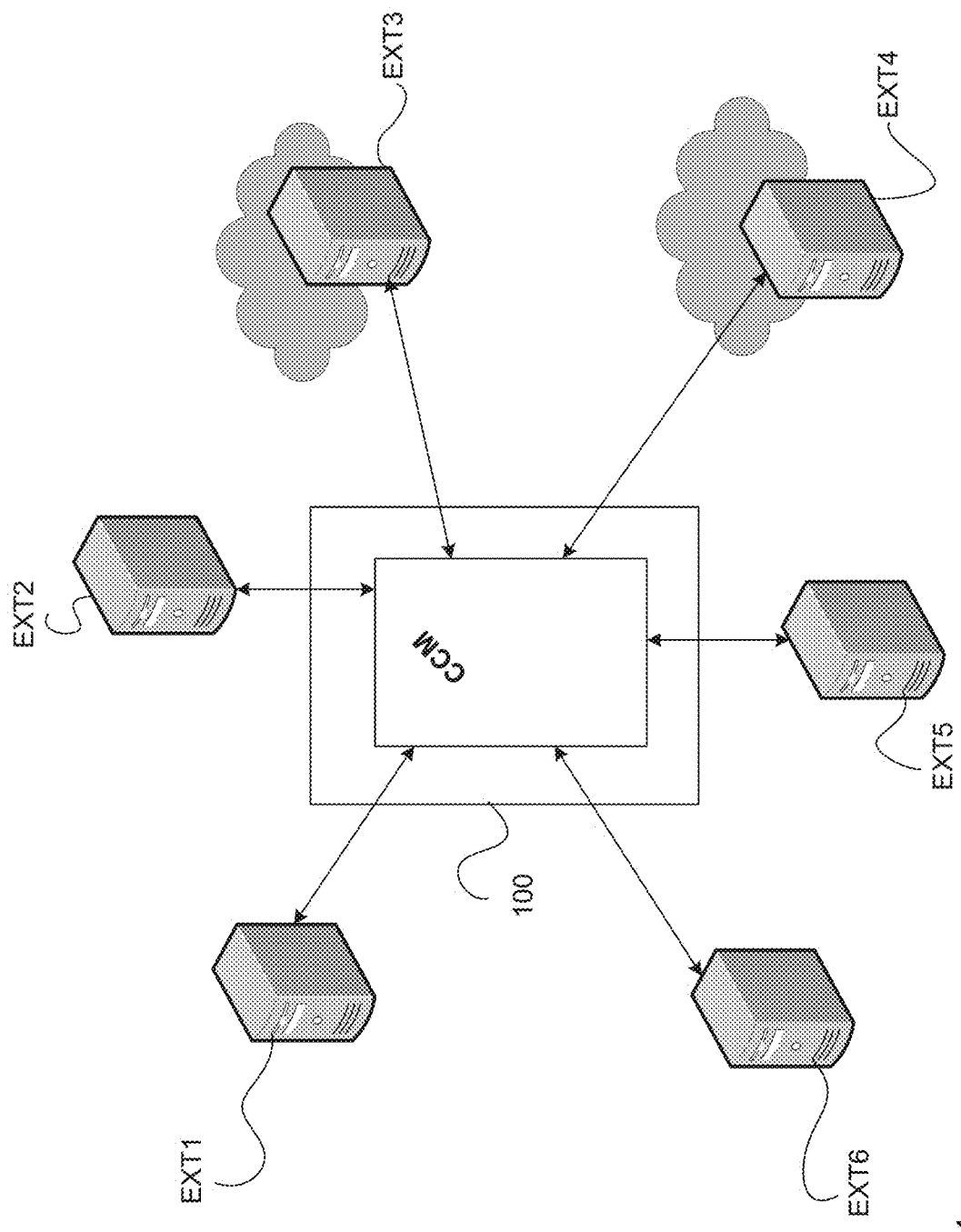
FIG. 1 shows an embodiment of a centralized content management system being connected to data repositories.

The present embodiments relate to a centralized content management system that provides access for mobile client devices to data being stored in one or more data repositories connected to the centralized content management system. The embodiments being discussed in this application represent functionalities of the centralized content management system. It is appreciated that the centralized content management system may contain one or more of the discussed functionalities, which means that the discussed embodiments may be combined to enhance the operation of the centralized content management system. The centralized content management system acts as a content hub enabling management of data across multiple data repositories. The data being managed does not need to be transferred to the centralized content management system, but it can be managed in its original location.

In relation to an enterprise content management system, the term "content" often refers to unstructured data only (e.g., documents). In the present application, the term "content" refers to both structured data, such as business objects (e.g., Customer, Project, Order, Case, Claim, etc. stored and/or processed in an enterprise resource planning (ERP) system, a customer relationship management (CRM) system, and other business systems based on a database), and unstructured data, such as documents, files, and other content in semi-structured or unstructured format. Thus, in this application, the term "content" refers to any data, including but not limited to documents, files, objects, and other data items. The terms "data" and "content" are used interchangeably in this application. Similarly, terms like "data item" and "content item" are used interchangeably. Further, the term "object" may be used interchangeably with the term "data item."

In the following description, the term "data repository" is used for defining "a system that stores and/or manages data", i.e., "a data vault", "a data storage", "an external data storage", "an external data repository", or "a repository". A data repository may be an enterprise content management system, an enterprise information management system, a document management system, an enterprise file synchronization and sharing (EFSS) system, a network file system, any file system, an enterprise resource planning (ERP) system, a customer relationship management (CRM) system, a business data system, a database system, an e-mail archive or other e-mail management system, a mail source etc. A data repository may also be a part of any of the aforementioned systems. A data repository may reside on-premises, off-premises, in the cloud, or in a combination of two or more of these, sometimes referred to as a hybrid system or a hybrid cloud system. In the present application, "data repository" refers to a repository that is an independent and/or separate and/or external system from the centralized content management system's point of view. Another descriptive term is "external data repository", which may be used interchangeably with "data repository".

It is appreciated that the centralized content management system may also comprise one or more internal data structures that act as containers for data that is stored in the centralized content management system. Such structures may be called "internal data storage".

There may be several data repositories for different types of data, each of which can be accessed by a client device. For example, there can be a data repository for customer relationship management, a data repository for quality-related documents, a data repository for human resources management, a data repository for highly secure and/or sensitive data, a data repository for personal data, a data repository in a cloud system, etc. In addition, different data repositories may be provided by different system providers. This means that data in different data repositories may not be organized in a similar manner in comparison with each other.

The present embodiments relate to a system that provides mobile client devices with a centralized access to data being stored in one or more data repositories connected to the centralized content management system. The centralized content management system thus surfaces information from multiple data repositories. "Centralized content management" (CCM) is a term used in this context. Other descriptive terms can be used in addition to or instead of these. For example, the present solution may be defined with the term "content hub", "data hub", "unified front-end", "unified information manager", or "intelligent metadata layer" when the centralized content management system also provides intelligent metadata to the content residing in multiple data repositories.

"Mobile client device" is a term used in this application for defining an apparatus that comprises a client application and/or mobile client user interface for the centralized content management system. The client application may be stored in a memory of the apparatus and may be executed by a processor of the apparatus. A mobile client device is also able to connect to various wired or short-range or long-range wireless communication networks, including but not limited to Wireless-Fidelity (Wi-Fi), wireless local access network (WLAN) techniques, and 2G-4G Wireless communication protocols (e.g., GPRS, EDGE, UMTS, CDMS2000, UMTS, WCDMA, TD-SCDMA, LTE, E-UTRAN), to communicate with a server of the centralized content management system. Non-limiting examples of a mobile client device are mobile terminals, such as mobile telephones, mobile computers, portable digital assistants (PDAs), pagers, laptop computers, smart phones, etc.

Thanks to the centralized content management system, content can be effortlessly authored and stored to the centralized content management system and/or one or more of its connected data repositories with a unified procedure or procedures, so that the users of the mobile client device do not need to learn multiple different procedures for how to interact with the content in any connected data repository or external system, or how to interact with the external systems themselves, or to know where and in which data repository or external system the organization prefers different types of content to be stored. From an organization's perspective, the centralized content management system positively affects productivity, security, control over business-critical content, and master data quality. In addition, all needed information is easily accessible by appropriate persons. Further, the centralized content management system offers an efficient way to find, collect, and gather data for sharing with external/internal users. For example, one of the data repositories or external systems can be used for sharing. This means that the organization can use a specific external system for sharing content with external users, and internal users can be controlled via the centralized content management system. The centralized content management system also provides large-scale information for business analysis and business intelligence tools, which can be organized, for example, as views in the centralized content management system. In addition, the centralized content management system may provide one or more RESTful, .NET, and/or other application programming interfaces (APIs) that enable programmatic access to some or all content in the centralized content management system and in data repositories connected to it. This can enable other systems to access content via a unified API instead of the other systems needing to connect to multiple data repositories with system-specific APIs.

The centralized content management system also provides mobile client devices with a unified user interface for the content residing in various data repositories. The benefits of such unified user interface are clear: to provide access to content in all data repositories via a single application on any mobile client device, and offline use of content in any data repository, even if the data repository does not support offline capabilities.

The centralized content management system can act as an intelligent layer on top of the different data repositories. This means that the centralized content management may be configured to augment the data repositories with such functionalities that the data repositories normally lack, e.g., a mobile access and/or offline capabilities. In addition, the centralized content management system is configured to interlink data between systems. This means that relationships between content in different systems can be created based on metadata, even when the different systems do not have metadata capabilities of their own, or the metadata in those systems is not suitable for creating relationships. When discussing metadata-based relationships, the present application means that one or more data items are linked to each other via metadata values. For example, when an object has a metadata value "Budget agreement," this can be more than just a simple tag or text string associated with the object. It can define a relationship to another object defined as a "Budget agreement," which can then also be linked or associated with any other object. It is appreciated that the relationship may be indirect, so that the object refers to another object via one or more other objects in between. Often, a numeric or other identifier is used as the metadata value that defines a relationship, in order to ensure that the relationship remains valid even if the display name of the referred-to object is changed. For example, a document object "Proposal.pdf" may have a metadata value "559637" for a metadata property "Customer", which means that the document object is referring to an object with the identifier "559637", the display name of which could currently be "ESTT Corporation", and thus a relationship exists between the document object "Proposal.pdf" and the customer object "ESTT Corporation". When a relationship exists across data repositories, the metadata value that defines the relationship may include a system or data repository identifier/name in addition to an object identifier/name in order to ensure that the target of the relationship can be uniquely identified across multiple data repositories.

According to an embodiment, the centralized content management system is used at least to provide, on a user interface of the client application, a view of content that is located in external data repositories and/or in the internal data storage of the centralized content management system. According to an embodiment, the centralized content management system may also be configured to generate and/or display metadata relating to the content in the external data repositories and/or in the internal data storage of the centralized content management system. In some embodiments, the centralized content management system is used also as a storage for metadata, even when the metadata defines data that is stored in an external data repository. In addition to the metadata repository, the centralized content management system may comprise further levels of management, e.g., index for search and/or file content storage.

Configuration of the Centralized Content Management System

FIG. 1 illustrates a simplified configuration of a centralized content management system according to an embodiment. Generally, the present embodiments relate to a centralized content management system CCM that acts as a centralized access point to at least one data repository EXT1-EXT6. Besides acting as a centralized access point to data located in various systems, the centralized content management system may also provide functionalities and intelligence for the data stored in the data repositories EXT1-EXT6. It is appreciated that the nature and the number of data repositories can vary in different embodiments. Therefore the present solution is not limited only to the one embodiment being presented by FIG. 1. It is also appreciated that the centralized content management system may contain more than one centralized content management servers and that the centralized content management system may comprise one or more databases for the purposes of the centralized content management system. The centralized content management system 100 further comprises a client application and/or mobile user interface for a mobile client device. In addition, the centralized content management system 100 comprises a server application for a server device. The client application and the server application are able to communicate with each other.

For building up a centralized content management system, any of the one or more data repositories EXT1-EXT6 need to be integrated and/or connected to the centralized content management system 100. Connecting and/or integrating a data repository EXT1-EXT6 to the centralized content management system 100 may be achieved by one or more of the following means: a) The centralized content management system 100 may comprise connector components that can interact with the technical interfaces of the data repository EXT1-EXT6 to access, read, write, delete, modify, process, operate on, and create data in the data repository EXT1-EXT6; b) The centralized content management system 100 may define technical interfaces that a data repository EXT1-EXT6 and/or a connector component can implement in order to enable the centralized content management system 100 to access, read, write, delete, modify, and create data in the data repository EXT1-EXT6 and/or the system or systems with which the connector component interfaces; c) The centralized content management system 100 may connect to and/or integrate with data hubs that provide access to one or more data repositories EXT1-EXT6 via a unified or partly unified interface or interfaces; d) The centralized content management system 100 may implement in part or in whole an industry-standard interoperability interface that enables the centralized content management system 100 to interface with any data repository EXT1-EXT6 that implements the industry-standard interoperability interface or an appropriate part of it. Connection and/or integration of a data repository EXT1-EXT6 to the centralized content management system 100 may also enable the data repository 100 to access, read, write, delete, modify, process, operate on, and create data in the centralized content management system 100 and/or any data repository EXT1-EXT6 connected and/or integrated to the centralized content management system 100. The centralized content management system 100 may comprise a framework that supports pluggable connector components, making it possible to connect new, previously unsupported data repositories to the centralized content management system 100 by adding an appropriate connector component and configuring the connection, without having to make other changes to the centralized content management system 100.

When a data repository EXT1-EXT6 is connected and/or integrated to the centralized content management system 100, some metadata may be associated with the data repository EXT1-EXT6. The metadata being associated may indicate whether the data repository is a complete system, e.g., a repository for an entire organization, or whether the data repository is part of a larger system, e.g., a project-specific repository or a folder that stores a specific type of data, such as employee agreements in the folder and/or one or more of its subfolders. In such case all content in that data repository can be seen to have the same characteristics, as if the metadata had been individually applied to all data items in the data repository, even though the metadata has been associated with the data repository only. In other words, the content in the data repository may inherit the metadata that is associated with the data repository. In addition, different parts of the data repository may be associated with metadata, for example, to indicate whether a specific folder or a specific container relates to a certain customer, whereby in such case, all the content in that folder/container relates to the customer. In other words, the content in a part of the data repository may inherit the metadata that is associated with that part of the data repository. The data repository, and/or a part of the data repository, such as a folder or a container or a result set defined by a search or a query, can be turned into an object in the centralized content management system, and such object can be associated with metadata.

In the lowest level of the integration, the data repository EXT1-EXT6 is only connected to the centralized content management system 100 so that the user of the mobile client device is able to navigate content in the data repository EXT1-EXT6 via the centralized content management system 100.

In addition to connecting the data repository EXT1-EXT6 to the centralized content management system 100 for enabling navigation of content, content in the data repository EXT1-EXT6 can be scanned and/or analyzed during or after the integration. The purpose of the analysis may be to identify such content that is business-critical or otherwise important, or to classify content into valuable and not-so-valuable content (e.g., by using algorithms and technologies similar to spam email filtering, such as Bayesian algorithms or other binary classification or multi-class classification algorithms). All content, or only content identified as valuable content, can further be classified into several groups based on similarity. For example, objects representing the content can be classified as offers, orders, agreements, proposals, etc., based on, for example, text analysis of the content and other analysis of the content and its metadata and relationships. Further, such scanning and/or analysis can produce additional metadata for describing the content, as well as forming relations with other content or data.

In addition to or instead of scanning/analysis, the content in the data repository EXT1-EXT6 may be indexed for search purposes. The indexing can occur during the integration, after the integration or as a result of scanning/analysis. Indexing is a procedure where content of a data repository is scanned and a list of terms is built. The scanned and indexed content may comprise textual or numerical content and/or its metadata, as well as audio, video or other content that is converted to text for indexing purposes. The list of terms is called an index. The indexing procedure makes an entry in the index at least for each significant term or word found in any content having textual data. In addition to the term, also a location of the term in a content item may be indicated. The index may also contain a reference (i.e., a path) to the data repository in question for each term or the content item from which the term originates. As a result of indexing, the mobile client device is able to perform a full-text based search on the content. By means of the index, the search can be targeted at the list of terms instead of the original textual content. The index can therefore be used as a quick reference to the actual content. The created index may be stored in the centralized content management system or in a location accessible by the centralized content management system. Indexing is a known operation, and therefore is not discussed any further.

In the present embodiments, the centralized content management system can be configured to 1) index all the content from a data repository; 2) not to index anything from a data repository; or 3) to index a portion of the content of a data repository, which portion is determined based on user/admin configuration, or based on a classification and/or analysis, or based on any other rule-based reason.

The centralized content management system is able to utilize any of the previous content processing methods separately or in combination.

After indexing, the content of the data repository is ready for full-text search by the centralized content management system.

When several data repositories are integrated to the centralized content management system, the content of each of them may be indexed as described above. As a result of the indexing, a centralized index for some or all data repositories is created and full-text based search can then be performed on some or all of the data repositories.

After integration, when new content, such as documents or files or other data items, are imported to/stored in a data repository, the new content may be scanned and indexed as described above, either right after the import/storage, or at some later time. Similarly, when content, such as a document or a file or a data item, is removed from the data repository, the corresponding index entries may be removed from the index.

When all the desired data repositories have been integrated and indexed, the content of the data repositories can be navigated and operated on through the centralized content management system by the mobile client device. In some situations, the indexing is not necessary, whereupon the content of data repositories can still be navigated and operated on through the centralized content management system. In such case, the centralized content management system may not be able to perform a full-text search on the content unless the data repository supports the full-text search by itself (also known as a "federated search"). Still, even without indexing, the intelligent operations of the centralized content management system may be applicable.

Mobile Access and Offline Capabilities for Content in any Data Repository

As mentioned, the present embodiments relate to a centralized content management system that provides centralized access for mobile client devices to data being stored in one or more data repositories connected to the centralized content management system.

This can be implemented by a mobile user interface client application ("CCM mobile UI") that is provided by the centralized content management system and that can be used on a mobile client device. An example of a layout of a mobile client device 200 is shown in FIG. 2. A block chart of the mobile client device 550 (i.e., an apparatus) is shown in FIG. 3. The apparatus 550 comprises processing means, such as a processor 590 for processing data. The apparatus 550 further comprises memory means, such as a memory 570, for storing computer program code 575, applications, and various electronic data. The apparatus 550 comprises controlling means, such as a control unit 530, for controlling functions in the apparatus 550. The control unit 530 may run a user interface software to facilitate user control of at least some functions of the apparatus 550. The control unit 530 may also deliver a display command and a switch command to a display 540 (also shown in FIG. 2) to display visual information, e.g., a user interface. The control unit 530 may communicate with the processor 590 and can access the memory 570. Further, the apparatus 550 may comprise input means e.g. in a form of a keypad 560 (also shown in FIG. 2), a keyboard, a stylus, etc. Further, the apparatus 550 comprises various data transfer means, such as a communication block 580 having a transmitter and a receiver for connecting to a network and for sending and receiving information. The communication means can be adapted for telecommunications and/or wide-range and/or short-range communication.

The CCM mobile UI may be implemented by using a programming language and other technologies that are native for a specific mobile device, such as Objective-C and the iOS Software Development Kit (SDK) for iOS devices (e.g., iPhone and iPad), or device-independent programming languages and technologies, such as HTML5, JavaScript, or Xamarin.

The CCM mobile UI enables the user to access content in one or more of the data repositories connected to the centralized content management system, even if one or more of those data repositories do not provide a mobile user interface of their own. Thus, the CCM mobile UI can provide users with mobile access to content that they could otherwise not access with their mobile device. Further, even if a data repository provides a mobile user interface of its own, the CCM mobile UI provides advantages because it enables a user to connect to more than one data repository by using a single, unified user interface application on a mobile device, even if some of the data repositories are provided by different vendors and therefore would otherwise need to be accessed via separate mobile user interface applications.

It is known that there exist mobile user interface applications ("file explorer apps") that enable a user to connect to multiple, typically cloud-based, file storage services. Such file explorer apps connect to the file storage services directly from the mobile device. This can be described as client device based connectivity to multiple data repositories. The centralized content management system of the present application and its CCM mobile UI provide advantages compared to such file explorer apps, because the CCM mobile UI provides centralized, server-based connectivity to multiple data repositories. The CCM mobile UI runs on a mobile device of a user and communicates with one or more servers of the centralized content management system. The server(s) of the centralized content management system provide services that enable accessing, storing, and operating on content that is stored in one or more data repositories connected to the centralized content management system. Thus, the CCM mobile UI can provide a user with mobile access to content in a data repository to which the user does not have direct access from the mobile device. For example, a data repository could reside behind a firewall in an on-premises data center and the firewall does not allow any communication from a mobile device outside the firewall to the data repository behind the firewall; however, the mobile device may communicate with server(s) of the centralized content management system residing on-premises or in the cloud, and the centralized content management system may have a communication channel from the server(s) of the centralized content management system to the data repository behind the firewall that the firewall allows. As a result, the CCM mobile UI may enable the user to gain access to content that would otherwise be inaccessible to the user. Further, as described in this application, the centralized content management system provides other advantages compared to file explorer apps, because the centralized content management system supports managing and/or storing metadata for content in data repositories.

The CCM mobile UI may provide offline access to content regardless of the data repository in which the content resides. Offline access means that data items are made available for the user of the mobile client device even if the mobile client device is not online from the centralized content management system's point of view (i.e., is not connected to the centralized content management system). The user of the CCM mobile UI may mark documents and/or other content for offline availability on an individual data item or folder basis, or specify metadata-based rules that define that any content that meets the specified criteria should be made available offline. The CCM mobile UI may then retrieve appropriate content from the centralized content management system's server(s) and store the content locally on the mobile device for offline access. The centralized content management system's server retrieves the appropriate content from the corresponding data repository if the content requested by the CCM mobile UI is not already cached or stored in the internal data storage of the centralized content management system's server(s).

According to an embodiment, the data items may be selected for offline access based on their metadata values. For example, a user of the client application may request content for offline access according to metadata-based criteria. The centralized content management system is configured to search and select data items that fulfill the defined criteria from each connected data repository, and create local copies of the selected data items to the memory of the mobile client device. These local copies can then be operated on by the mobile client device even if the mobile client device is not connected to data repositories or to the central content management system.

Further, the centralized content management system may enforce various access rights or access restrictions to content via the CCM mobile UI based on, for example, a user's identity, location, device, content metadata, and/or rules specified by a user and/or an administrator. The centralized content management system may, for example, make some content available for offline use while preventing some content from being stored locally on a mobile device.

Automatic metadata suggestions and assisted creation of new metadata objects (described in more detailed later in the application) have specific advantages in the CCM mobile UI because entering metadata is typically more difficult, time-consuming, and/or error prone when using a user interface on, e.g., a touch-screen mobile device, compared to using a personal computer with a physical keyboard. Metadata suggestions make it easier and more convenient for the user to enter metadata for data items when storing new content in the centralized content management system by using a mobile device, because instead of having to type the needed metadata values as text, the user only needs to confirm one or more metadata suggestions by pointing to the metadata suggestions displayed in the user interface. Assisted creation of new metadata objects, such as a new organization object, can provide even greater advantages because it can significantly reduce the amount of typing required by the user (for example, by automatically retrieving address and other contact information from one or more metadata providers).

User Interface and Views of the Centralized Content Management System

The objects being stored in a data repository may be shown in (viewed through) the user interface of the centralized content management system's client application according to the corresponding data repository's normal structure. This means, for example, that if the data repository has a folder-based structure, the objects viewed through the user interface of the centralized content management system may be shown in a folder-based structure. This can be called an "external view". For example, the external view allows the user of the mobile client device to browse content of a data repository using the folder structure present in the data repository, without having to model that folder structure in the centralized content management system with traditional folder or similar constructs stored in the centralized content management system. This makes it easy for a user of the mobile client device to move from another data repository to the centralized content management system by maintaining the same navigation structures that are present in that data repository. This also improves the performance of the centralized content management system because the centralized content management system does not need to replicate the folder structure present in the data repository in the centralized content management system.

The external view can be inserted in the centralized content management system's view hierarchy in the same way as other views: at the root of the centralized content management system, inside other views, or inside metadata-defined virtual folders (i.e., metadata-driven grouping folders), and defined to appear in either that folder only, or in all folders on the same grouping level. External views may or may not inherit any filtering options defined for parent views or by parent virtual folders. The system administrator may be responsible for defining the view settings in such a way that the view considers the context and passes proper parameters to the data repository to display appropriate objects for that context. To accommodate this, it is possible to use virtual folder based property substitutions in the view parameters.

In the user interface of the centralized content management system's client application, the views may behave similar to traditional folders. If the data repository is folder-based, then the view may not be displayed as metadata-driven unless the data repository supports searching for content and/or other data items by metadata values or otherwise forming dynamic views to the content and/or other data in the data repository. On the other hand, if the data repository is an ECM system or another database-like system or a system that utilizes a database, the views may be metadata-driven. In either case, the client application does not have to understand the view definition. At the same time, the data repository—or even the connector in between—may display the same document or other object in multiple views. As with common views, the client application may receive initial view settings, such as column settings, from the server, while allowing the user to tweak these settings.

Figure 4:
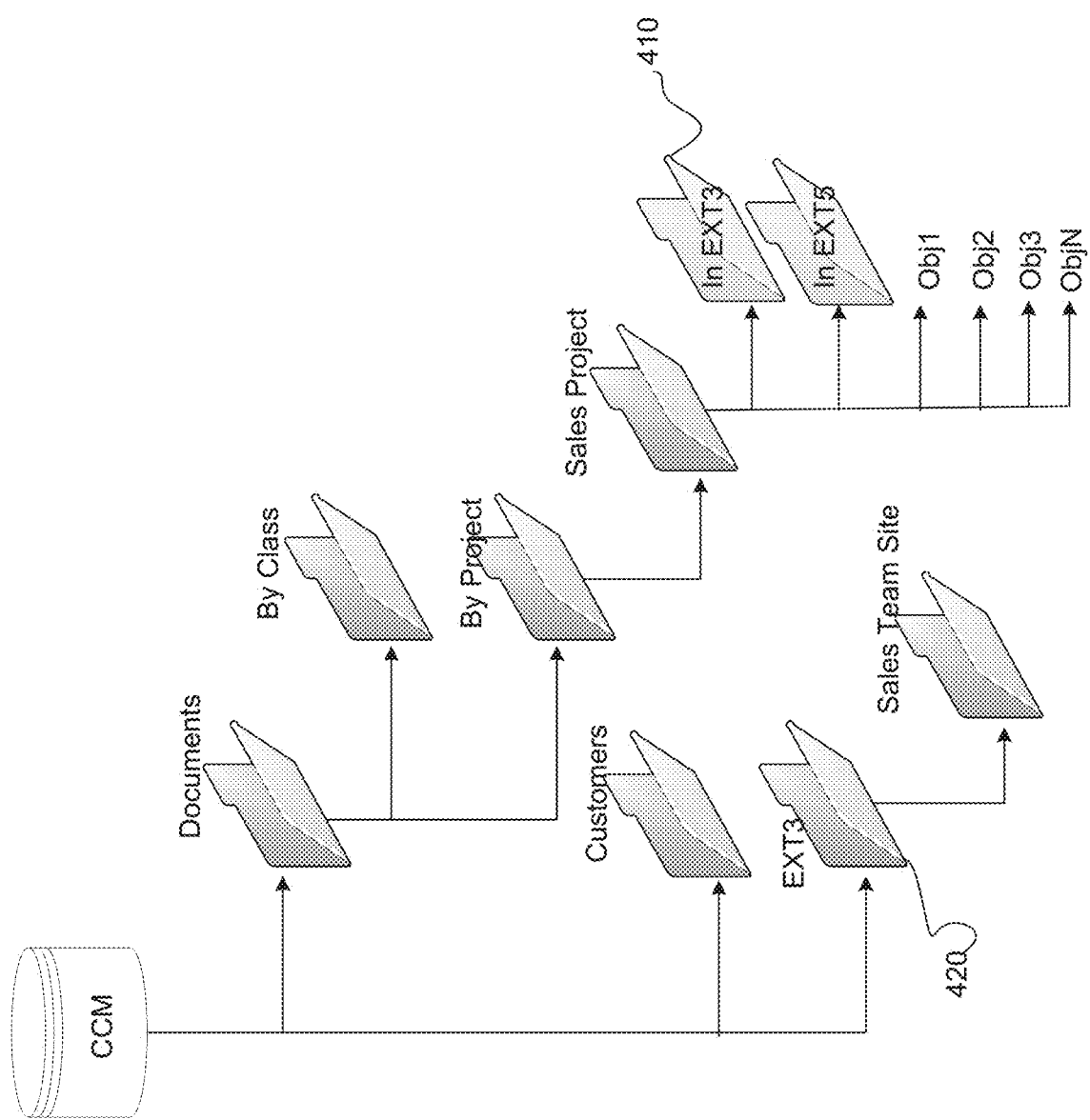
FIG. 4 shows an embodiment of a centralized content management system having external views.

FIG. 4 illustrates external views in a view hierarchy of the centralized content management system. The centralized content management system CCM may provide views based on one or more metadata properties, i.e., "Documents", "Customers", "By Class", "By Project", or directly to the data repository "EXT3." In FIG. 3, "EXT3", "In EXT3", and "In EXT5" represent external views.

A view that is configured to show documents and/or other objects and folders based on metadata properties gathers within the view documents and/or other objects which have certain metadata properties that match the criteria of the view. A view displaying data items from more than one data repository in a same virtual folder when the data items have metadata matching metadata-based criteria of said virtual folder may be shown on a mobile user interface of the client application. As implied, the criteria may include a single metadata property or more than one metadata property. By using FIG. 4 as an example, the view "Documents"/"By project" comprises any content object that is of the type "Document" and has a property "Project" in its metadata. Further, the centralized content management system is able to classify the objects based on the property value for the property "Project." In FIG. 4 example, any content object that comprises a property "Project" having a value "Sales Project" is included in the virtual folder "Sales Project" regardless of which data repository the object resides in, or the object's actual location in that data repository. This means that the data items from more than one data repository are displayed in the same virtual folder when the data items have the same metadata value in the same metadata property. According to the example of FIG. 4, objects Obj1, Obj2, Obj3 and ObjN fulfill the filtering condition (i.e., Project=Sales Project). It is thus appreciated that the content objects from more than one data repository can be shown in the centralized content management system's user interface equally or in a similar fashion, regardless of the data repository in which they reside. The user interface of the centralized content management system may display a visual indicator, such as an icon or text, to indicate to the user the data repository in which a particular object resides.

In addition, the centralized content management system is configured to provide a view on a mobile user interface, which is able to display one or more data items that are related to a certain data item, on the same screen with that certain data item or on a separate screen. For example, a user of the mobile client device may request a listing of data items that are related to a specific data item A. The centralized content management system is configured to determine data items that refer to the data item A; or data items that are referred to by the data item A; or both. The determination is based on a metadata value of the data item A and/or metadata values of other data items. For example, if the data item A has a name or identification "Summer School", then any data item having a metadata value "Summer School" is considered to be related (by reference) to the data item A, i.e., such data items are referring to the data item A. Similarly, if the data item A has a customer property having a value Plumbers Ltd, then the data item A is considered to be related to a data item with a name or identification Plumbers Ltd, i.e., the data item Plumbers Ltd is referred to by the data item A. A metadata value that acts as a reference to another data item may be a numerical value or other identifier value, instead of specifying the display name of the referred-to data item, in order to make the reference independent of changes to the display name of the referred-to data item.

In the user interface of the centralized content management system's client application, a view status relating to the external view may be shown by displaying, for example, a link icon next to the view name. The icon may also be used as an overlay for each document or other object in the view to show that these documents are documents/objects from particular data repositories. In addition, the type of the content (unmanaged, managed, controlled) may also be indicated by corresponding icons if such have been defined for the content. The metadata card (example shown in FIG. 5) may also be shown, but it may lack editing capabilities. In addition, the external view may comprise an icon for creating a new object directly to the data repository.

In the centralized content management system, when clients request a view listing at the root level, for example, the server may return all the normal views visible together with the external views tied to that view. Once the user navigates to an external view, the server is configured to query the appropriate data repository or repositories for the view contents. This query happens through a custom data repository connector. The connector is configured to be responsible for implementing the mapping between the data repository structure and views of the centralized content management system. The connector is configured to implement any interface, e.g., a .NET or REST interface, that the centralized content management system may use to interact with the connector and with the data repository.

The centralized content management system may be configured to preview, open, and/or modify data items from connected one or more data repositories. When a file relating to a data item is opened on a client device, the file may be opened by the dedicated application directly from the original location, for example, from the data repository in which it resides. Alternatively, the centralized content management system's server may download the file from the original location, and the centralized content management system's server delivers the file to the mobile client device for opening by the dedicated application. In the latter case, the mobile client device is able to open the file for the user even if the data repository is not directly accessible by the mobile client device or the user. The centralized content management system may cache content in order to speed up retrieval and/or opening of the files from data repositories.

Storing New Content in the Centralized Content Management System and/or its Connected Data Repositories The centralized content management system makes it easier for users of mobile client devices to store new content in the centralized content management system and/or one or more of its connected data repositories, assists organizations in enforcing policies regarding the storage locations of content, and improves the level of integration and interoperability of a variety of important business applications and systems.

Previously, in order to store new content in a specific data repository, a mobile client device has had to directly interact with a user interface that is specific to that data repository. This has required the mobile client device to have direct access to the data repository and its user interface. In order to store content in multiple data repositories provided by different vendors, the mobile client device has been required to have direct access to multiple data repositories and their corresponding user interfaces, and a user to learn and remember those disparate user interfaces.

An organization typically prefers different types of content to be stored in different data repositories. For example, the organization may want all service contract documents to be stored in an enterprise content management (ECM) data repository, all employee agreement documents to be stored in a human resources management (HRM) data repository, and all personal photos to be stored in a cloud-based enterprise file synchronization and sharing (EFSS) data repository. Previously, when a user of the mobile client device has had to explicitly choose the data repository with which to interact when storing new content, the user may have chosen to save the new content, such as a new service contract document, in the wrong data repository from the organization's point of view, such as storing it in an EFSS data repository instead of the ECM data repository.

Further, some data repositories may not provide the mobile client device with a high level of integration and/or interoperability with the applications that the user uses for creating and editing content on a mobile device, e.g., Microsoft Word, Adobe Acrobat, Notes, or Mail. For example, a data repository may provide a web-based mobile user interface or other user interface without support for operating system specific integration means like API contracts, a virtual file system, or interfaces, such as App Extensions on the iOS platform (e.g., Share, File Provider, Document Provider, Actions, and Finder Sync App Extensions) or other similar extension and/or integration means on other platforms like Android or Windows. When the client application of a data repository does not have support for such integration means, the user may not be able to save a new document or other new content directly to the data repository, but may need to go through additional steps such as first saving a new document to the local storage of the mobile device and then dragging & dropping, uploading, or otherwise moving or copying the document to the data repository as a separate operation. Such lack of a high level of integration and/or interoperability with the users' applications makes storing new content in the appropriate data repository less convenient or in some cases even technically impossible for the user, decreases the user's productivity, and may lead to the user resisting or avoiding storing content in the data repository preferred by the organization, which may further result in organization-level problems in finding and managing information.

The centralized content management system disclosed by the present application makes it easier for a user to store new content and/or access and modify existing content by providing the user with a unified user interface that the user can use to store content in the internal data storage of the centralized content management system and/or one or more of its connected data repositories. By using the unified user interface, the user can store new content and/or access and modify existing content in one or more of the data repositories even if the user does not have direct access to the data repository and its user interface, and/or without requiring the user to learn to use data repository specific user interfaces.

Additionally, the unified user interface of the centralized content management system enables the organization to enforce rules regarding the data repositories used for storing different types of content. For example, the centralized content management system can be configured to automatically store all service contract documents in an enterprise content management (ECM) data repository, all employee agreement documents in a human resources management (HRM) data repository, and all personal photos in a cloud-based enterprise file synchronization and sharing (EFSS) data repository. Instead of the mobile client device always being required to interact with these data repositories directly, the user may store new content or access and modify existing content by using the unified user interface of the centralized content management system's client application, and the centralized content management system automatically directs the content to be stored in an appropriate data repository according to the rules specified by the organization. The rules can be specified, e.g., by means of a centralized configuration by a system administrator.

The centralized content management system may utilize metadata to make decisions on where to store the new content provided by the user. Some of the metadata may be inferred automatically based on context, such as the logged-in user's identity, location, application, type of file, etc. Some of the metadata may be extracted, derived or inferred from the new content itself, such as the type of a document, the name of a contracting party in a service contract document, a property value contained within the contents of a file, or a key concept or keyword generated based on words in the new content and potentially with the help of consulting a synonym or concept network or library. Some of the metadata may also be input by the user. The centralized content management system may use the metadata to automatically store the new content in an appropriate data repository, for example, to store a service contract document in an ECM data repository on-premises and a personal photo in an EFSS data repository in the cloud. Alternatively, the centralized content management system may allow the user to specify the target data repository for the new content or to override the default target data repository pre-selected by the centralized content management system based on metadata and/or other preferences and configuration.

The unified user interface of the centralized content management system may provide support for operating system specific integration means like API contracts, a virtual file system, or interfaces, such as App Extensions on the iOS platform (e.g., Share, File Provider, Document Provider, Actions, and Finder Sync App Extensions) or other similar extension and/or integration means on other platforms like Android or Windows. The support for such integration means makes the centralized content management system appear to the operating system and/or applications of the user's mobile client device as a standard data storage location similar to a local memory card, a local hard disk drive, a network drive, a cloud storage, or another storage that is directly accessible by the mobile client device similar to local storage; or a part, folder, or section of such storage. The implementation of operating system specific integration means in the client application of the centralized content management system can provide the user with a high level of integration and/or interoperability with the applications that the user uses for creating and editing content, e.g., Microsoft Word, Adobe Acrobat, Notes, or Mail, as well as any other application running on the user's mobile client device. Applications typically provide the user with a means to save new content, such as a new document, to a storage location that implements a specific interface on the mobile client device. By implementing the specific interface, the centralized content management system appears to the operating system and/or applications as a storage location to which an application may directly save new content or changes to existing content, without requiring the user to first save the new content to a temporary location before uploading it to the target data repository. For example, the user may use Microsoft Word, Adobe Acrobat, Notes, Mail, or another application to save a new document or a file, or changes to an existing document or file, to the storage location provided by the centralized content management system. The centralized content management system may prompt the user to enter or confirm metadata for the new content as part of the saving operation, e.g., by displaying an electronic form (or e-form) interface, or "metadata card", to the user. Finally, the centralized content management system may store the new and/or changed content in an appropriate data repository based on configuration as described previously in this application.

Further, the unified user interface of the centralized content management system may comprise a "file explorer extension" component, which enables the file explorer interface of the operating system of the mobile client device to present the centralized content management system and/or its connected data repositories as an integral part of the file explorer user interface on the mobile client device. A file explorer extension enables the file explorer interface of the operating system of the mobile client device to present any data to the user as a virtual folder. When a user browses into the virtual folder by the mobile client device, the data is presented as a tree-structured hierarchy of folders and files. Users and applications are able to interact with the contents of the virtual folder in much the same way as with any other object in the file explorer interface, such as standard files and folders in the local storage of the mobile client device.

Together, the implementation of operating system specific integration means and a file explorer extension in the client application of the centralized content management system offer a high level of integration and interoperability with the operating system and/or applications on a user's mobile client device.

When the centralized content management system stores new and/or changed content, the centralized content management system may store a copy of the new and/or changed content, such as a file, in the internal data storage of the centralized content management system, in addition to or instead of storing it in another data repository. Further, the centralized content management system may store specific centralized content management metadata for the new content in the centralized content management system or in another location. The centralized content management system may also store metadata related to the new content in the target data repository.

The centralized content management system may also store the new content in a data repository without storing the metadata for the new content in the centralized content management system or in another location.

Automatic Metadata Suggestions and Assisted Creation of New Metadata Objects

The centralized content management system may automatically extract, derive, or infer metadata values from the content of a file or another data item, or from relationships of data items.

There are two types of metadata in the related technology. "Traditional" metadata is so called file system metadata that is a standard part of a file system. File system metadata has fixed metadata fields and is often automatically created from information available to the file system. For example, the size of the file, the name of the file, the creator of the file, and last modified by, date created, date modified, etc., are typical examples of file system metadata. At this point, it is worth mentioning that some of the organization's data processing applications make it possible to define other file attributes, e.g., an author, keywords, etc., that are stored within the file. However, these attributes are not considered metadata for the purposes of the present application since they are incorporated within a file and therefore are part of the content. Another reason for such attributes not qualifying as metadata in this application is that the support of those attributes/properties depends on the file format: for instance, attributes/properties are supported for .docx-format files, but not for .txt-format files, since files in the .txt format are not able to store such attributes/properties. File system metadata may comprise, for example, the name of a file and the creator of a file as metadata properties having values "agreement.docx" and "John Smith," respectively.

In addition to file system metadata, there are also business-critical (BC) metadata that are used in enterprise content management systems. Other terms for business-critical metadata are ECM metadata or EIM metadata. BC metadata is more flexible and dynamic than file system metadata, and it is in addition to file system metadata. BC metadata is not dependent on files or file formats: it can be added, created and modified, and instead of being stored in a file system, the BC metadata may be stored in a database that is external to the file system. Still, the content of the file, i.e., file data, may be stored in a file system and not in the database. It is thus appreciated that traditional metadata is stored with the file data in the file system, and BC metadata is stored independently of the file data in a database or other location. BC metadata may comprise, for example, the name of the person who accepted an offer, the term of a contract, the term of an offer, the class or type of a document, and the workflow state of a document as metadata properties having values "Mike Gogh", "13 Nov. 2020", "1 Dec. 2015", "Offer", and "Offer accepted", respectively.

An example of a metadata card comprising BC metadata properties having values is shown in FIG. 5. The metadata card 300 comprises properties Class, Name, Organization, Other party, Starting date, Expiry date, Value, Responsible person, Contact person, and Workflow state having values Agreement, Co-operation, Biz LTD, Plumbers LTD, 1 Jun. 2015, 1 Jun. 2020, 30,000, Mike More, Luke Less, and Signed, respectively.

Additionally, automatically extracting, deriving, or inferring metadata values can be used as part of storing new content in the internal data storage of the centralized content management system or in a connected data repository: For example, the centralized content management system may display a metadata card interface as part of a "save" or "store" operation initiated by the user. In the metadata card interface, the centralized content management system may display one or more automatically extracted, derived, or inferred metadata values as "metadata suggestions". The metadata suggestions may be displayed and placed directly in the metadata input fields in such a way that they get stored as business critical metadata when the user confirms the save or store operation e.g. by pressing a "Save" or "Create" button in the user interface. Alternatively, the metadata suggestions may be displayed elsewhere in the user interface, typically in the proximity of the corresponding metadata input fields in the user interface, in such a way that they are not stored as business critical metadata when the user confirms the save or store operation e.g. by pressing a "Save" or "Create" button in the user interface, unless the user points to one or more of the metadata suggestions or otherwise indicates that the user wishes to confirm a specific metadata suggestion as user-confirmed business critical metadata for the content.

Instead of automatically storing automatically extracted, derived, or inferred metadata as business critical metadata, displaying metadata suggestions in a metadata card interface to the user and requiring the user to explicitly confirm those metadata suggestions that the user wishes to be stored as business critical metadata has the advantage of resulting in higher data quality, since the user can pick only the good metadata suggestions and avoid any inappropriate metadata suggestions from being stored as user-confirmed business critical metadata.

In addition to storing as user-confirmed business critical metadata those metadata suggestions that the user explicitly confirms, the centralized content management system may also store one or more of the other metadata suggestions as a specific type of business critical metadata that the system can distinguish from user-confirmed business critical metadata. This specific type of business critical metadata can be described as "automatic business critical metadata", while the metadata values confirmed by the user can be described as "user-confirmed business critical metadata". This approach enables the centralized content management system to utilize the automatically extracted, derived, or inferred metadata values in various operations, while also avoiding the negative effects of storing potentially lower quality metadata in a way that it cannot be distinguished from user-confirmed business critical metadata. This may also be useful in non-interactive use cases, where the centralized content management system runs a background process that creates automatic business critical metadata for data items.

The centralized content management system may suggest the creation of new metadata objects as a result of a user confirming a metadata suggestion. For example, when a user stores a new service contract document that mentions "GC Plumbers Inc." in the textual content of the document, the centralized content management system may display the value "GC Plumbers Inc." as a metadata suggestion for a "Contracting party" field, even if "GC Plumbers Inc." is not a known organization object to the centralized content management system or any of its connected data repositories and thus not yet available as a choice in a lookup list of the "Contracting party" field. This may be indicated by a visual clue in the user interface, such as an asterisk before or after the name "GC Plumbers Inc.". If the user confirms using the "GC Plumbers Inc." metadata suggestion as business critical metadata, the centralized content management system can initiate the creation of a new organization object. The new organization object may be created automatically, or may require additional user input. The new organization object may be stored in a specific data repository as any other new content, as described previously in this application. Once the new organization object has been created, a reference to it can be stored as business critical metadata for the service contract document of this example. It is appreciated that the previous is merely an example, and many other kinds of metadata objects can be created based on metadata suggestions.

As part of the creation of a new metadata object from a metadata suggestion, the centralized content management system may perform one or more additional steps of extracting, deriving, or inferring metadata values based on the metadata suggestion and the related content. This process may include communicating with other services and data sources. For example, in the previous example of initiating the creation of a new organization object "GC Plumbers Inc." from the corresponding metadata suggestion, the centralized content management system may communicate with a business contact information catalog service in order to retrieve a business ID (Identification), address, telephone, web, email, and/or other contact information related to an organization with the name "GC Plumbers Inc." or similar. Further, the centralized content management system may communicate with a financial information service in order to retrieve information on the creditworthiness of "GC Plumbers Inc." based on the business ID retrieved earlier. Further, the centralized content management system may determine the GPS (Global Positioning System) coordinates of an office of "GC Plumbers Inc." by sending the previously retrieved textual address information to a map or location service that returns GPS coordinate information. It is appreciated that these are merely examples, and many other types of information can be retrieved from data repositories and/or other systems in connection with providing metadata suggestions to the user and/or assisted creation of new metadata objects. Metadata suggestions and creation of new metadata objects can also be cascaded/nested, e.g., a metadata suggestion provided to the user as part of the creation of the "GC Plumbers Inc." organization object in the previous example could further result in initiating the creation of yet another metadata object, such as a contact person object for "John Smith" because the creation of new metadata objects has suggested "John Smith" as being CEO (Chief Executive Officer) of "GC Plumbers Inc."

The centralized content management system comprises a framework for pluggable "metadata providers". The framework defines one or more interfaces that the centralized content management system uses to communicate with one or more metadata provider modules. Each metadata provider module knows how to interface with one or more actual systems or services that can provide useful data for use as metadata suggestions or other automatic metadata. For example, a metadata provider module may receive as input the textual or binary content of a document, file, or other data item, and will return as output metadata values such as recognized named entities like names of organizations, persons, and/or locations identified in the provided input. A metadata provider module may also return as output key concepts, keywords, or a summary of the provided input. Further, a metadata provider may return output that classifies or categorizes the provided input into one or more classes/categories from a set of two or more classes/categories in a binary or multi classification/categorization schema. Further, the metadata provider may use other data sources to return additional information, such as address information when provided the name of an organization, for example.

The centralized content management system may use a combination of more than one metadata provider, and may use one or more metadata providers in a parallel fashion for independently gathering more metadata suggestions than a single metadata provider could generate, or in a cascading fashion, using output from a first metadata provider as input to a second metadata provider. The centralized content management system may also combine output from multiple metadata providers in a way that increases the quality of metadata suggestions, such as including in metadata suggestions only such recognized named entities that more than one metadata provider has returned as output. Metadata providers may additionally return as output a confidence level value and/or post probability for one or more of the provided outputs, in order to inform the centralized content management system of the reliability level of the automatically extracted, derived, or inferred metadata value or classification information.

Version History and Version Control Capabilities on Top of any Data Repository

The centralized content management system may provide version history and version control capabilities for the content, regardless of the capabilities of the data repository in which the content resides. For example, whenever a user of the mobile client device modifies a document or another data item via the centralized content management system, the centralized content management system can store a copy of the previous, unmodified version of the document or other data item in the centralized content management system, even if the data repository in which the document or other data item resides does not support retaining version history (i.e., previous versions). The centralized content management system may use the centralized content management system's own storage for storing the previous version(s), or it can store them in a location in the original data repository or in another data repository. From the user's point of view, such operations are transparent and the user does not need to manually manage multiple versions of the document or other data item. The centralized content management system may continue to place the latest version of the document or other data item in the original data repository, thus making the latest version available also to users who access the content via the original data repository (i.e., not via the user interfaces provided by the centralized content management system).

Regardless of the capabilities of the data repository in which the content resides, the centralized content management system can provide additional version control capabilities to the user, such as creating major and minor versions, comparing versions, tagging and/or labeling versions, and rolling back to a previous version. The centralized content management system may use a text-based or binary delta algorithm for reducing the storage space required by previous versions of content by storing only the differences between different versions instead of storing each previous version in its entirety.

Workflow Capabilities on Top of any Data Repository

The centralized content management system may provide workflow capabilities for the content, regardless of the capabilities of the data repository in which the content resides. For example, the centralized content management system may enable the user of the mobile client device to associate a data item with a workflow and a workflow state. Further, the centralized content management system may enable an administrator to define a workflow that potentially includes multiple states, state transitions, conditions, actions, and other workflow-related properties.

An example of a workflow is the review and approval of new purchase orders: A new purchase order may be initiated as an object in an enterprise resource planning (ERP) system, which is a data repository that is connected to the centralized content management system. The centralized content management system may be configured to automatically or manually apply a workflow such as "Reviewing and approving a purchase order" to the new purchase order object that appears in the ERP data repository. The centralized content management system can store and/or manage metadata for the purchase order object. The centralized content management system can support moving the purchase order object through various workflow states automatically and/or manually, and may perform actions such as generating a PDF-format document from the data of the purchase order object as part of a workflow state transition. The generated PDF-format document may be stored in another data repository by the centralized content management system or in the internal data storage of the centralized content management system The workflow and/or workflow state of the object may be stored as metadata that is stored and/or managed by the centralized content management system. This enables the centralized content management system to associate a workflow and/or a workflow state to a data item in any data repository, even if the data repository where the data item resides does not support workflow and/or metadata capabilities. The centralized content management system can offer workflow capabilities for content in any data repository and/or across data repositories, without requiring that the content is moved or migrated to the centralized content management system.

The centralized content management system may provide additional workflow-related functionality such as notifying appropriate persons of their duties at different steps of a workflow by email or other means, permissions settings, and other access control for a workflow, workflow state(s), and state transition(s), conditional branching of state transitions, triggers for automatic state transitions, and a graphical user interface for visualizing and/or designing a workflow that potentially spans multiple data repositories.

Transferring Content from One Data Repository to Another Data Repository

The centralized content management system enables moving and/or copying content between data repositories and/or the internal data storage of the centralized content management system in a way that is transparent to users: a user of the mobile client device can continue to access, store, and operate on content by using the unified user interface of the centralized content management system even if content managed by the centralized content management system is moved from one data repository to another. The unified user interface of the centralized content management system can thus provide an abstraction layer that helps hide the physical location of content from the user. This can have advantages in several circumstances, some of which are described below by way of examples.

As an example, the centralized content management system may allow a user to share content with users that do not have direct access to the centralized content management system or the data repository in which the content currently resides. Such users can be called "external users". Previously, sharing content with such external users may have required the user to copy the content to another data repository: for example, copying a marketing brochure document from a network shared folder residing on an on-premises server (which cannot be accessed by external users) to a cloud-based file sharing service (which can be accessed by external users). This has various disadvantages, such as difficulties in managing duplicated content, and the risk of forgetting to update the document in the cloud-based file sharing service when the original document is updated in the network shared folder residing on the on-premises server. Now, the centralized content management system can allow the user to simply indicate that the marketing brochure document should be shared with external users. The centralized content management system can use business critical metadata to indicate that the document should be available also to external users. Based on such business critical metadata, the centralized content management system can automatically upload a copy of the document to a cloud-based file sharing service configured as a data repository in the centralized content management system for this purpose. Further, the centralized content management system can automatically update the document in the cloud-based file sharing service whenever the original document is updated in the network shared folder residing on the on-premises server (which network shared folder is a data repository from the centralized content management system's point of view). When the user indicates that the document should no longer be shared with external users, the centralized content management system can automatically remove the document from the cloud-based file sharing service.

As another example, an organization may wish to consolidate data repositories and eliminate one or more legacy systems. Such systems can be data repositories from the centralized content management system's point of view. Users of the mobile client devices can access content in those data repositories via the unified user interface of the centralized content management system. The centralized content management system can be configured to move all content from a first data repository to a second data repository or to the internal data storage of the centralized content management system, thus enabling the organization to completely retire the system of the first data repository. Still, the centralized content management system can provide the same view(s) to that content via the unified user interface of the centralized content management system, making the retiring of the first data repository and its corresponding system transparent to the users. By retiring one or more data repositories, the organization may achieve various advantages, including cost and time savings.

As yet another example, an organization may wish to move content from an on-premises data repository to a cloud-based data repository (or vice versa). Users of the mobile client devices can access content in those data repositories via the unified user interface of the centralized content management system. The centralized content management system can be configured to move all content from the on-premises data repository to the cloud-based data repository (or vice versa). Still, the centralized content management system can provide the same view(s) to that content via the unified user interface of the centralized content management system, making the re-location of the content transparent to the users. By moving content from one data repository to another, the organization may achieve various advantages, including cost savings, improved manageability, improved security, and better alignment with the organization's IT strategy.

As yet another example, in addition to all the content, only part of the content in a data repository may be moved to another data repository by the centralized content management system. An organization may wish to ensure that any intellectual property related documents are stored on-premises instead of being stored in the cloud. The centralized content management system can be configured to automatically move any content that is identified as being related to intellectual property to an on-premises data repository if the content is currently stored in a cloud-based data repository. Similarly, an organization may wish to ensure that any content that includes personally identifiable information (PII) is stored on-premises instead of being stored in the cloud. Still, users can access such content via the unified user interface of the centralized content management system without needing to know that the content has been re-located from one data repository to another data repository.

Similar to providing a unified user interface to users for accessing, storing, and operating on content in data repositories connected to the centralized content management system, the centralized content management system can provide a unified application programming interface (API) for use by other programs, applications, and systems for accessing, storing, and operating on content in data repositories connected to the centralized content management system.

Integration Concepts

An integration data model is designed for the centralized content management system.

The data model contains support for simple view navigation, displaying object metadata as properties of the centralized content management system, modifying the metadata, and creating new objects in the external views. The support for object creation supports predefined metadata, wherein the centralized content management system prefills certain properties based on the current view. Metadata structures ObjectType and PropertyInfo allow an administrator to map external content to the centralized content management system so it can be displayed in the client using the concepts of the centralized content management system.

There are operations that are provided for enabling the centralized content management system to communicate and integrate with data repositories.

Some examples of the operations are given in below:

GetViewContents(viewId) returns the items contained in a specified view. This includes child views/folders and directly contained objects. The interpretation of viewId is up to the connectors. The connector may allow the user to specify view/folder paths using, for example, a folder path string, a URL, or a query syntax.

GetObjectTypes( ) returns the available object types.

GetPropertyInfos( ) returns the available property information (metadata structure information).

GetRootViews( ) returns the root views which can be navigated.

GetObject(objId) returns information about a single object.

GetObjectFile(objId, fileId) retrieves the object file content based on the file identifier contained on the object.

UpdateObject(objId, objSpec) updates the specified object.

UpdateObjectFile(objId, fileId, fileSpec) updates the specified object file.

DeleteObject(objId) deletes the specified object.

DeleteObjectFile(objId, fileId) deletes the specified object file.

CreateObject(viewId, objSpec) creates the object in a specified path.

CreateObjectFile(objId, fileSpec) creates the object file for the specified object.

It is appreciated that the above operations are merely examples, and the integration interface may be specified in multiple ways, such as by using operations organized in a different manner and/or with less or more parameters for each operation.

By using the example of FIG. 4, an external view connection to data repository EXT3 410 can be defined as EXT3.com, and the view path can be defined as Projects/% PROJECT.NAME_OR_TITLE %. The view path is a dynamic path using the name of the project (i.e., Sales Project in FIG. 4) defined with the grouping levels. In this example, when a user navigates to the external view at "Documents/By Project/Sales Project/In EXT3" in the centralized content management system, the centralized content management system retrieves the items contained in this view by calling the GetViewContents method for the data repository EXT3 with the parameter value "Projects/Sales Project". Similarly, a connection to an external view EXT3 420 can be defined as EXT3.com, and when a user navigates to the external view EXT3 in the centralized content management system, the centralized content management system retrieves the items contained in this view by calling the GetViewContents method for the data repository EXT3 with an empty parameter value. The method call may return various items, including a folder "Sales Team Site" shown in FIG. 4. When the user further navigates to the path "EXT3/Sales Team Site" in the centralized content management system, the centralized content management system retrieves the items contained in this view by calling the GetViewContents method for the data repository EXT3 with the parameter value "Sales Team Site".

As another example based on FIG. 4, the data repository EXT3 may be an enterprise content management (ECM) system with metadata capabilities. In such case, an external view connection to data repository EXT3 410 can be defined as estt.EXT3.com, and the view path can be defined as a query specification as follows:

"ObjectType=Document AND Project=% PROJECT.NAME_OR_TITLE %"

The query specification is dynamic, using the name of the project (i.e., Sales Project in FIG. 3) defined with the grouping levels. In this example, when a user navigates to the external view at "Documents/By Project/Sales Project/In EXT3" in the centralized content management system, the centralized content management system retrieves the items contained in this view by calling the GetViewContents method for the data repository EXT3 with the parameter value "ObjectType=Document AND Project=Sales Project".

The centralized content management system may model and utilize features and operations of a data repository as much as possible. For example, the centralized content management system can use the data repository's object check-out (or similar); version history; access right mapping; etc.

Architecture

According to an embodiment, the functions and operations of the centralized content management system may be executed in a centralized content management server or servers. The server apparatus comprises at least one processor and at least one memory, and a computer program stored in the memory. The computer program is configured to implemented any one or more of the embodiments disclosed in this application. The client application communicates with the server or servers and requests one or more data items from one or more connected data repository. The client application does not need to know that there are several data repositories because the content of the data repository is provided as if it was internal content, i.e. content that is stored in the internal data storage of the centralized content management system. The centralized content management server, on the other hand, communicates with the data repositories.

It is appreciated that even though the mobile client device does not need to communicate with a data repository directly, there can still be some client-based operations. For example, when a file is opened from a data repository, the identity and access rights of the client can be used. This means that the centralized content management server may have read access to the data repository, but the client also has the right to edit the content of the data repository.

In general, the operations of the centralized content management system performed on other data repositories can be implemented by a user identity being configured in the centralized content management system regardless of the actual user of the centralized content management system. Alternatively, the operations of the centralized content management system performed on other data repositories can be implemented in a pass-through fashion so that the identity of the user of the centralized content management system is used in the data repository. As another alternative, the operations of the centralized content management system can be implemented in other data repositories in such a manner that the identity of the user of the centralized content management system is mapped to an identity of a user of a particular data repository in a pre-defined manner. It is appreciated that the centralized content management system can either use its own "centralized" identity in the various data repositories or the access rights can vary based on who is using the centralized content management system at that point. For example, different content may be shown to different users from the same external view if the identity of the user of the centralized content management system affects which user identity the centralized content management system uses for accessing the data repository.

Figure 6:
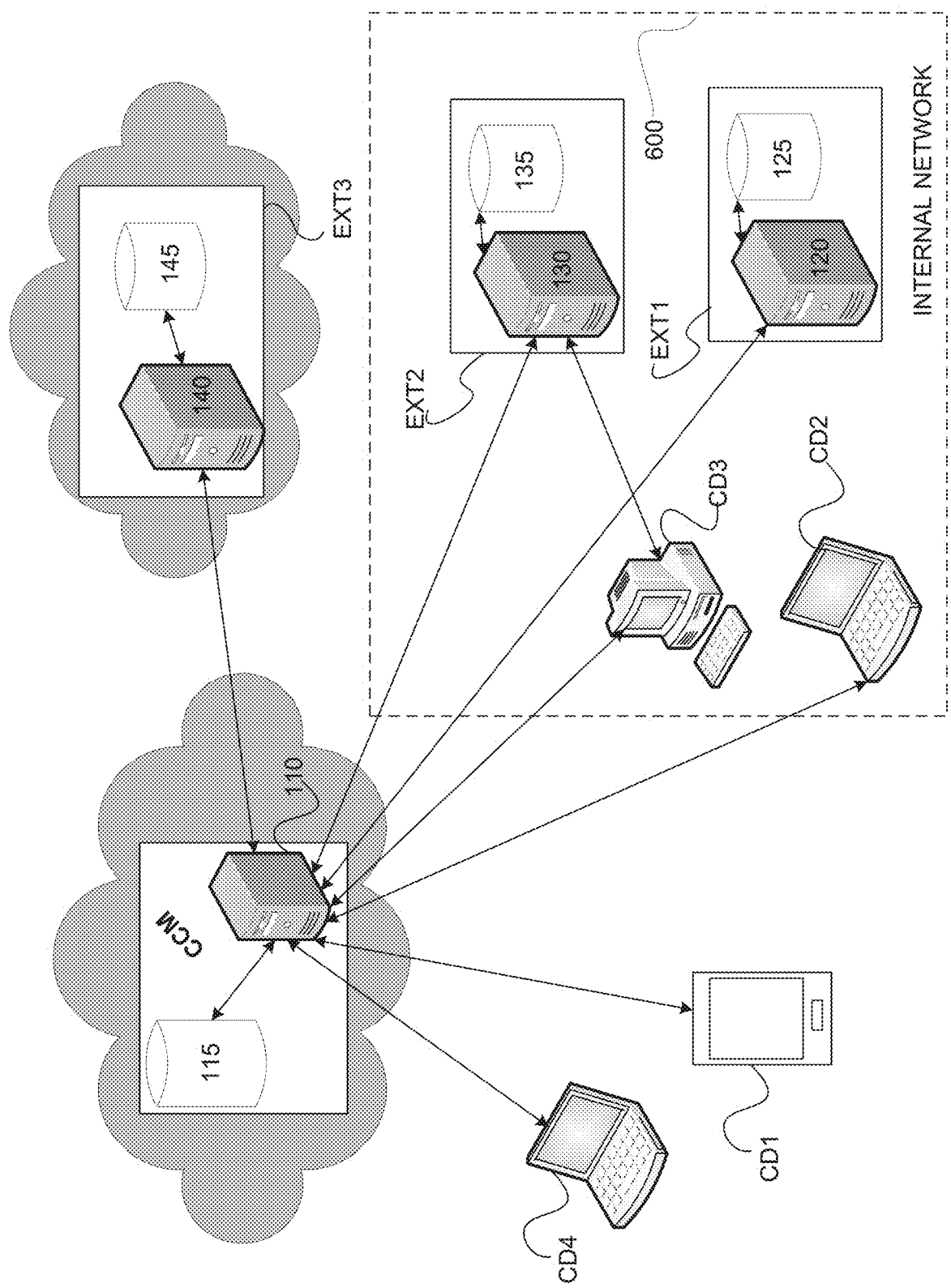
FIG. 6 shows an embodiment of a centralized content management system providing access for mobile client devices to one or more data repositories.

An example of a system configuration relating to a centralized content management system is shown in FIG. 6.

The centralized content management system CCM comprises a CCM server 110 that is configured to communicate with one or more data repositories EXT1, EXT2, EXT3. The CCM server 110 comprises or is connected to a CCM database 115. The CCM database is configured to store at least metadata for data items residing in any of the connected data repository EXT1, EXT2, EXT3. Each of the one or more data repositories EXT1, EXT2, EXT3 comprises a server 120, 130, 140 and a database 125, 135, 145. Any or any part of the one or more data repositories may be located in a cloud. Client devices CD1, CD2, CD3, CD4 comprising also mobile client devices CD1, CD2, CD4, are configured to communicate with the CCM server 110 by means of a CCM client application being stored in the client device. The CCM client application is an application that belongs to the centralized content management system and provides uniform and centralized access for a client device to the connected data storages EXT1, EXT2, EXT3. The client devices CD1, CD2, CD3, CD4 may represent different types of client devices, e.g., a mobile phone, a smart phone, a laptop, a personal computer, a tablet device, etc. Any one or more of the data repositories may be located in a cloud or on-premises. Any one or more of the client devices may be located on an internal network or on an external network. Any communication from/to an internal network goes through the firewall 600.

As shown in the example of FIG. 6, the centralized content management system CCM is located in a cloud (other solutions, where the centralized content management system is on-premises, off-premises, or in a combination of two or more of these, are possible as well). In this embodiment, a client device CD1, CD4 in an external network can directly access the CCM server 110, which in turn can communicate with a data repository EXT1, EXT2 in the internal network via the firewall 600. This makes it possible to allow any client device CD1, CD2, CD3, CD4 an access to any data repository EXT1, EXT2, EXT3 through the centralized content management system. FIG. 6 shows that client devices CD1, CD4 do not have access to data repositories EXT1, EXT2 due to the firewall 600. However, because the centralized content management server 110 is located outside the internal network protected by the firewall 600, the client devices CD1, CD4 are able to access data repositories EXT1, EXT2 via the centralized content management server 110. It is appreciated that this kind of solution is more reasonable, since it is easier and more secure to allow traffic between an internal network and a CCM server 110 than between an internal network and all the client devices outside the internal network.

It is appreciated that FIG. 6 is an example of the possible system solution for the present invention. However, any deviation of this is possible. For example, the centralized content management system may contain more than one centralized content management server and that the centralized content management system may comprise one or more databases for the purposes of the centralized content management system. Instead of a database, the centralized content management system may comprise a database and a file data storage. Further, with respect to data repositories EXT1-EXT3, instead of their databases there may be more than one database; a database and a file data storage; or a file data storage only. In an embodiment, the file data storage may be located in the database. In addition, instead of one server, there may be more than one server.

Figure 7:
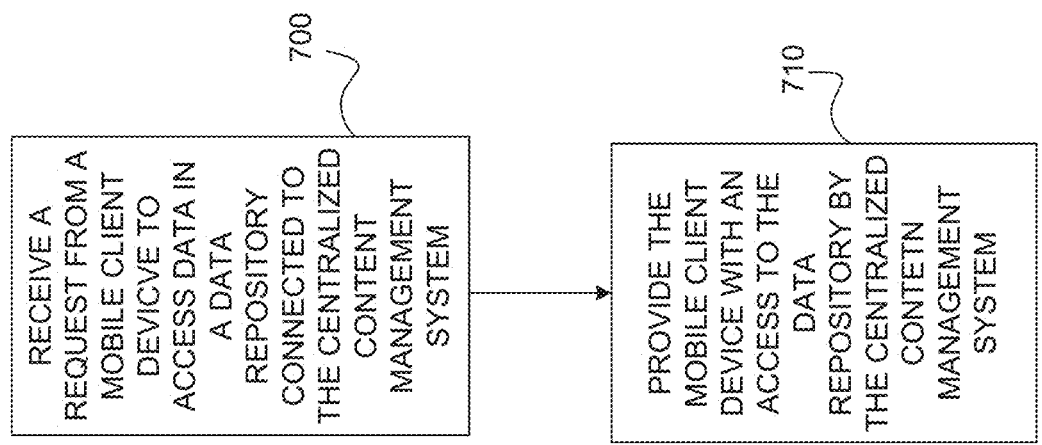
FIG. 7 is a flowchart illustrating a method according to an embodiment.

FIG. 7 is a flowchart illustrating a method according to an embodiment, wherein data is managed in one or more data repositories by a centralized content management system. The centralized content management system comprises at least one server, and said one or more data repositories are connected to said centralized content management system. At least one of said one or more data repositories resides on a device that is other than a server of the centralized content management system. The method comprises receiving 700 by a server of the centralized content management system a request from a mobile client device to access data in a data repository connected to the centralized content management system; and providing 710 the mobile client device with an access to the data repository by the centralized content management system.

An apparatus according to an embodiment is configured to implement a method shown in FIG. 7. The apparatus may also be configured to implement one or more of the embodiments being disclosed in the present application. An apparatus comprises at least a processor and memory including computer code. The code means with the processor are configured to perform the method steps shown in FIG. 7 and one or more of the embodiments of the present application.

The various embodiments may provide advantages. For example, there is a single point of access for a mobile client device to all content in the enterprise regardless of the location of the content. This point of access allows powerful search operations on all the content by a mobile client device. By means of the single point of access, content can be discovered, accessed, viewed, operated on, and created through a unified interface regardless of content's location. The centralized content management system provides a common user interface and harmonized user experience because it is not dependent on the device or on the repository. The centralized content management system is easy to use since it provides a common way of working with several repositories.

The various embodiments of the invention can be implemented with the help of computer program code that resides in a memory and causes the relevant apparatuses to carry out the invention. For example, a device may comprise circuitry and electronics for handling, receiving, and transmitting data, computer program code in a memory, and a processor that, when running the computer program code, causes the device to carry out the features of an embodiment. Further, a network device, such as a server, may comprise circuitry and electronics for handling, receiving, and transmitting data, computer program code in a memory, and a processor that, when running the computer program code, causes the network device to carry out the features of an embodiment.

It is apparent that the present invention is not limited solely to the above-presented embodiments, but it can be modified within the scope of the appended claims.

The invention claimed is:

1. A method for a system comprising:
a centralized content management system having at least one server wherein said centralized content management is connected to one or more external data repositories, said one or more external data repositories storing data, and being functionally independent from said centralized content management system, wherein at least one of said one or more data repositories reside on a device that is other than the server of the centralized content management system, the method comprising:
receiving by a server of the centralized content management system a request from a mobile client device to access any of the external data repositories connected to the centralized content management system and the data being stored in said external data repositories;
determining by said centralized content management system, one or more data objects in said one or more external data repositories that have a centralized content management system specific metadata stored in said centralized content management system matching at least one metadata-based criterium, wherein said one or more data objects are only stored in said one or more external data repositories and wherein said centralized content management system specific metadata of said one or more data objects is only stored in said centralized content management system, wherein said data objects in the one or more external data repositories are manageable according to said centralized content management system specific metadata by said centralized content management system without transferring the data objects to the centralized content management system;
allowing the mobile client to access the determined data objects in the external corresponding data repository through a user interface of the centralized content management system and to access metadata for said determined data objects in the corresponding data repository in the server of the centralized content management system;
displaying data objects from more than one corresponding data repository in a same virtual folder when the data objects have metadata matching metadata-based criteria of said virtual folder; and
when the request comprises a request to display data objects being related to a specific data object, the method further comprising
determining data objects that refer to the specific data object and the data objects that the specific data object refers to; and
displaying the determined data objects, wherein at least one of the determined data objects is stored in a different data repository than the specific data objects.

2. The method according to claim 1, wherein a data repository is located in one of the following: on-premises data center comprising a firewall, in cloud.

3. The method according to claim 1, wherein the server of the centralized content management system is located in one of the following: on-premises, in cloud.

4. The method according to claim 1, wherein the request comprises a request to mark a data item in the data repository for offline availability, the method further comprising;
creating a local copy of the data item; and
storing the local copy of the data item to a memory of the mobile client device.

5. The method according to claim 4, further comprising closing the access for the mobile client device to the data repository;

receiving from a user modifications on the local copy of the data item by a client application of the centralized content management system;

saving the modifications on the local copy of the data item; and when a new request from the mobile client device is received to access the data repository, and synchronizing at least the local copy of the data item from the mobile client device to the data item in the data repository.

6. The method according to claim 1, wherein the request comprises a request to store a new data item to a data repository.

7. The method according to claim 1, wherein the request comprises a request to open a data item from a data repository.

8. The method according to claim 1, wherein the centralized content management system comprises a pluggable connector framework for connecting a new data repository to the centralized content management system by using a pluggable connector component.

9. An apparatus comprising:
at least one processor, memory including computer program code, wherein the apparatus belongs to a system comprising a centralized content management system having at least one server, wherein said centralized content management system is connected to one or more external data repositories, said one or more external data repositories storing data, and being functionally independent from said centralized content management system, wherein at least one of said one or more data repositories reside on a device that is other than the server of the centralized content management system, the memory and the computer program code configured to, with the at least one processor, cause the apparatus to perform at least the following:
receive a request from a mobile client device to access any of the external data repositories connected to the centralized content management system and the data being stored in said external data repositories;
determine by said centralized content management system, one or more data objects in said one or more external data repositories that have a centralized content management system specific metadata stored in said centralized content management system matching to at least one metadata-based criterium, wherein said one or more data objects are only stored in said one or more external data repositories and wherein said centralized content management system specific metadata of said one or more data objects is only stored in said centralized content management system, wherein said data objects in the one or more external data repositories are manageable according to said centralized content management system specific metadata by said centralized content management system without transferring the data objects to the centralized content management system;
allow the mobile client to access the determined data objects in the corresponding external data repositories through a user interface of the centralized content management system and to access metadata for said determined data objects in the corresponding data repositories in the server of the centralized content management system;
cause the apparatus to display data objects from more than one corresponding data repository in a same virtual folder when the data objects have metadata matching metadata-based criteria of said virtual folder; and
when the request comprises a request to display data objects being related to a specific data objects, wherein the apparatus further comprises computer program code to cause the apparatus to
determine data objects that refer to the specific data object and the data object that the specific data object refers to; and
display the determined data objects, wherein at least one of the determined data objects is stored in a different data repository than the specific data object.

10. The apparatus according to claim 9, wherein the apparatus is a server of the centralized content management system.

11. The apparatus according to claim 9, wherein a data repository is located in one of the following: on-premises data center comprising a firewall, in cloud.

12. The apparatus according to claim 9, wherein the apparatus is located in one of the following: on-premises, in cloud.

13. The apparatus according to claim 9, wherein the request comprises request to mark a data item in the data repository for offline availability, wherein the apparatus further comprises computer program code to cause the apparatus to
create a local copy of the data item; and
store the local copy of the data item to a memory of the mobile client device.

14. The apparatus according to claim 13, further comprising computer program code to cause the apparatus to
close the access for the mobile client device to the data repository; and when a new request from the mobile client device is received to access the data repository, synchronize at least the local copy of the data item from the mobile client device to the data item in the data repository.

15. The apparatus according to claim 9, wherein the request comprises a request to store a new data item to a data repository.

16. The apparatus according to claim 9, wherein the request comprises a request to open a data item from a data repository.

17. The apparatus according to claim 9, wherein the centralized content management system comprises a pluggable connector framework for connecting a new data repository to the centralized content management system by using a pluggable connector component.

18. A computer program product for a system comprising:
a centralized content management system having at least one server for storing data, wherein said centralized content management system is connected to one or more external data repositories, said one or more external data repositories storing data, and being functionally independent from said centralized content management system, wherein at least one of said one or more data repositories reside on a device that is other than the server of the centralized content management system, said computer program product being embodied on a non-transitory computer readable medium, comprising computer program code configured to, when executed on at least one processor, cause an apparatus or a system to:
receive a request from a mobile client device to access any of the external data repositories connected to the centralized content management system and the data being stored in said external data repositories;

determine by said centralized content management system, one or more data objects in said one or more external data repositories that have a centralized content management system specific metadata stored in said centralized content management system matching to at least one metadata-based criterium, wherein said one or more data objects are only stored in said one or more external data repositories and wherein said centralized content management system specific metadata of said one or more data objects is only stored in said centralized content management system, wherein said data objects in the one or more external data repositories are manageable according to said centralized content management system specific metadata by said centralized content management system without transferring the data objects to the centralized content management system;

allow the mobile client to access data objects in corresponding external data repositories through a user interface of the centralized content management system and to access metadata for said determined data objects in the corresponding requested data repositories in the server of the centralized content management system; and display data objects from more than one corresponding data repository in a same virtual folder when the data objects have metadata matching metadata-based criteria of said virtual folder; and wherein the request comprises a request to display data objects being related to a specific data object, further causing the apparatus or system to determine data objects that refer to the specific data object and the data objects that the specific data object refers to; and display the determined data objects, wherein at least one of the determined data objects is stored in a different data repository than the specific data object.

* * * * *